United States Patent [19]

Matsuzaki et al.

[11] Patent Number: 5,611,406

[45] Date of Patent: Mar. 18, 1997

[54] AUTOMATIC GUIDING AND TRACKING DEVICE

[75] Inventors: Kouichi Matsuzaki; Setsuo Yamagishi, both of Tokyo, Japan

[73] Assignee: Nikko Electric Industry Co., Ltd., Tokyo, Japan

[21] Appl. No.: 500,837

[22] Filed: Jul. 11, 1995

[30] Foreign Application Priority Data

Sep. 16, 1994 [JP] Japan ................................ 6-222131

[51] Int. Cl.⁶ ...................................................... B62D 6/00
[52] U.S. Cl. ...................................................... 180/167
[58] Field of Search ................................... 180/167, 168

[56] References Cited

U.S. PATENT DOCUMENTS

| | | | |
|---|---|---|---|
| 3,235,025 | 2/1966 | Quinn | 180/167 |
| 3,812,929 | 5/1974 | Farque | 180/167 |
| 3,856,104 | 12/1974 | Ohba | 180/167 |
| 5,295,551 | 3/1994 | Sukonick | 180/167 |

FOREIGN PATENT DOCUMENTS

| | | | |
|---|---|---|---|
| 0206411 | 8/1989 | Japan | 180/168 |
| 1131487 | 12/1984 | U.S.S.R. | 180/167 |
| 1246911 | 7/1986 | U.S.S.R. | 180/167 |

*Primary Examiner*—Richard M. Camby
*Assistant Examiner*—Frank Vanaman
*Attorney, Agent, or Firm*—Wenderoth, Lind & Ponack

[57] ABSTRACT

A guiding signal generator and transmitter is included on a guiding device for generating and transmitting a guiding signal for guiding a tracking device. Provided on the tracking device are first and second guiding signal receivers spaced apart by a predetermined distance for receiving the guiding signal, and a controller for detecting a direction to and a distance from the guiding device based on outputs from the first and second guiding signal receivers and the predetermined distance. The configuration prevents collisions between the guiding device and the tracking device.

3 Claims, 7 Drawing Sheets

50ms

40KHz

1ms

100ms

AUTOMATIC GUIDING AND TRACKING DEVICE

BACKGROUND OF THE INVENTION

The present invention relates to an automatic guiding and tracking device employing radio devices, and more particularly to an automatic guiding and tracking device in which a tracking device can automatically judge a distance to a guiding device.

In a known conventional automatic guiding and tracking device, as disclosed in the official gazette of Japanese Utility Model No. 14687/1992, a player carries a radio transmitter device (a guiding device) for generating guiding signals, while a tracking device is mounted on a golf cart which receives the guiding signals and automatically tracks the player. This device is configured such that a signal from a bearing sensor in the radio transmitter device is transmitted therefrom as a radio wave, that the radio wave so transmitted is received by the tracking device on the golf cart, and that steering of the golf cart is performed by obtaining a difference between bearing output values from the guiding device and the golf cart, respectively, whereby the golf cart is caused to automatically follow (track) the guiding device.

With a conventional automatic guiding and tracking device of this type, since there is transmitted and received no distance information for judging the distance between the guiding device and the tracking device, there is a risk of the tracking device being colliding with the guiding device.

The present invention was made to solve the above problem and an object thereof is to provide an automatic guiding and tracking device in which a distance to a guiding device and a tracking direction can automatically be judged by a tracking device and in which the tracking device can track the guiding device while maintaining a certain distance range therebetween, whereby collision of the two devices is prevented.

SUMMARY OF THE INVENTION

The present invention is directed to the provision of an automatic guiding and tracking device comprising a guiding device movable to a desired position and a tracking device for tracking the movement of the guiding device, wherein the guiding device comprises in turn a guiding signal generating and transmitting means for generating and transmitting a guiding signal for guiding the tracking device and wherein the tracking device comprises in turn first and second guiding signal receiving means disposed apart from each other at predetermined positions for receiving the guiding signal, and a control means for detecting direction and distance relative to the guiding device based on outputs from the first and second guiding signal receiving means and distances to the predetermined positions.

Consequently, with the present invention, it is possible to control the tracking of the tracking device relative to the guiding device based on direction and distance.

DESCRIPTION OF THE PREFERRED EMBODIMENT

Referring to the accompanying drawings, one embodiment of the present invention will be described below.

This embodiment is one in which a guiding device is carried by a player, while a tracking device is mounted on a golf cart.

Figure 1:
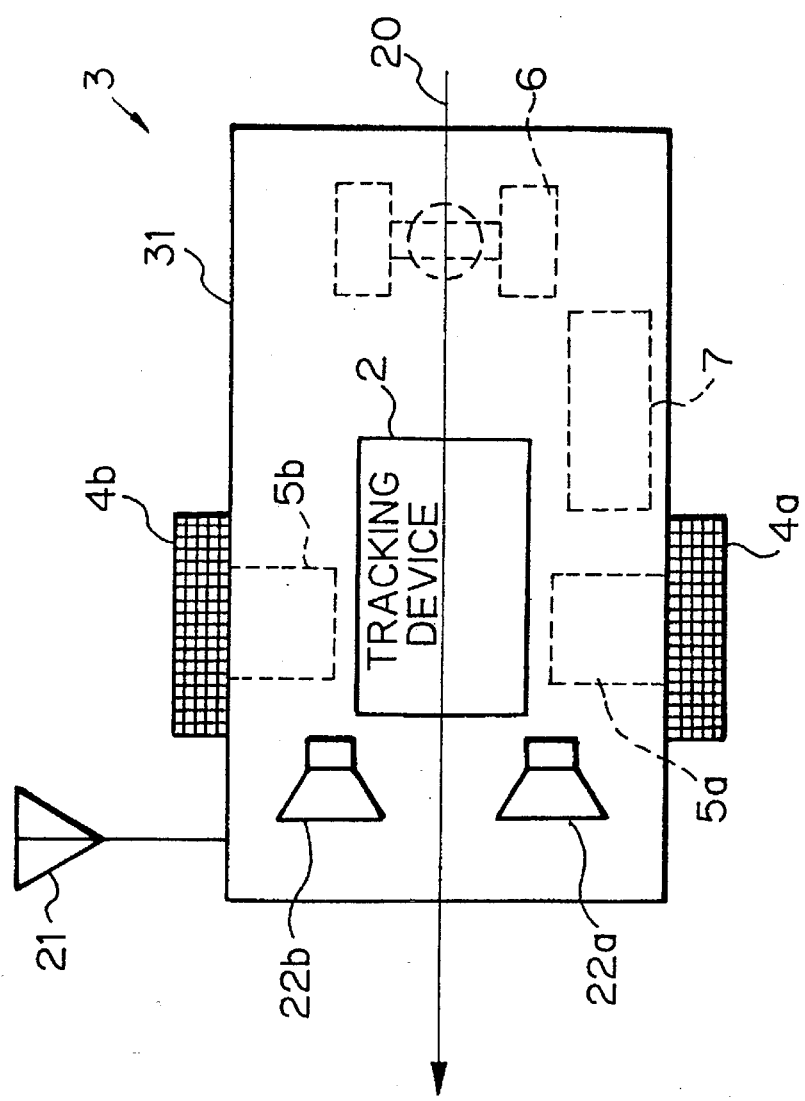
FIG. 1 is a schematic diagram showing one embodiment of the present invention.
Figure 1:
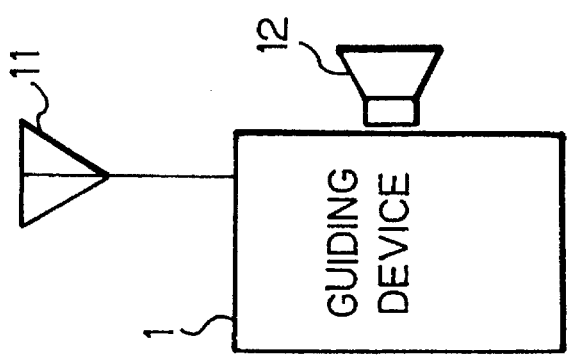

FIG. 1 is a schematic diagram showing one embodiment of the present invention.

In FIG. 1, reference numeral 1 denotes a guiding device constituted by a radio device and is adapted to be carried by a player on his waist. The guiding device 1 has a transmission antenna 11 and an ultrasonic transmission oscillator 12 mounted thereon.

Furthermore, a tracking device 2 is mounted on a golf cart 3, and a radio wave receiving antenna 21, a first ultrasonic receiving oscillator 22a and a second ultrasonic receiving oscillator 22b are provided on the tracking device 2. The first and second ultrasonic receiving oscillators 22a, 22b are disposed at positions transversely located at an equal distance from a longitudinal center line 20 of the golf cart.

In FIG. 1, reference numeral 31 denotes a body frame of the golf cart 3, and left and right driving wheels 4a and 4b are mounted on this body frame 31 for running. In addition, reference numeral 5a denotes a left wheel driving motor for rotationally driving the left driving wheel 4a, and reference numeral 5b denotes a right wheel driving motor for rotationally driving the right driving wheel 4b, these driving motors being designed to be rotationally driven independently. Reference numeral 6 denotes rear idler wheels designed to trail the front wheels.

Moreover, a battery 7 is mounted on the body frame 31 for supplying DC power source to respective sections of the golf cart 3.

Figure 2:
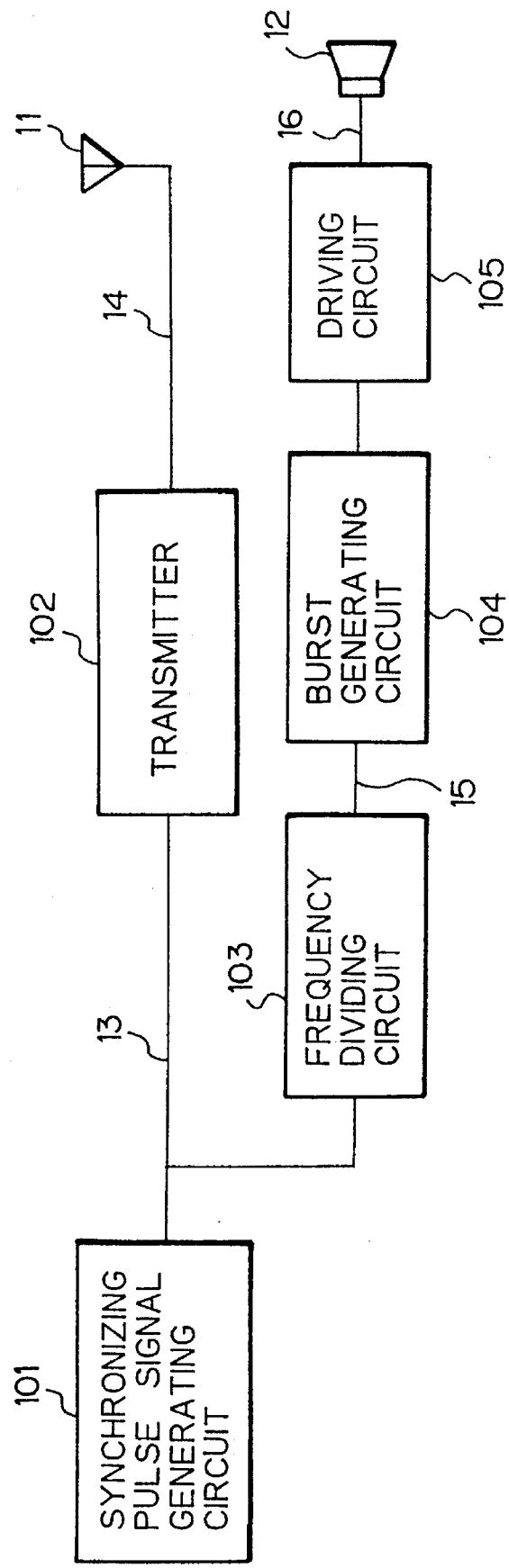
FIG. 2 is a circuit diagram showing the configuration of a guiding device 1 shown in FIG. 1.

FIG. 2 is a circuit diagram showing the configuration of the guiding device 1.

In FIG. 2, reference 101 denotes a synchronizing pulse signal generating circuit for generating a synchronizing pulse signal 13 of low frequency (20 Hz in this embodiment) for synchronizing timings when ultrasonic signals 16 are transmitted, reference numeral 102 a transmitter employing a frequency modulating system for modulating the frequency of the synchronizing pulse signal 13 for transmission, reference numeral 11 is an antenna for transmitting an FM wave (a frequency modulated wave), reference numeral 103 a frequency dividing circuit for dividing the frequency of the synchronizing pulse signal 13 into two for generation of an ultrasonic transmission timing signal 15, reference numeral 104 a burst generating circuit for setting oscillated frequency and radiation continuation time for an ultrasonic wave, reference numeral 105 a driving circuit for driving the ultrasonic transmission oscillator, and reference numeral 12 an ultrasonic transmitting oscillator for transforming an ultrasonic burst signal 16 into an ultrasonic wave for transmission.

Figure 3A:
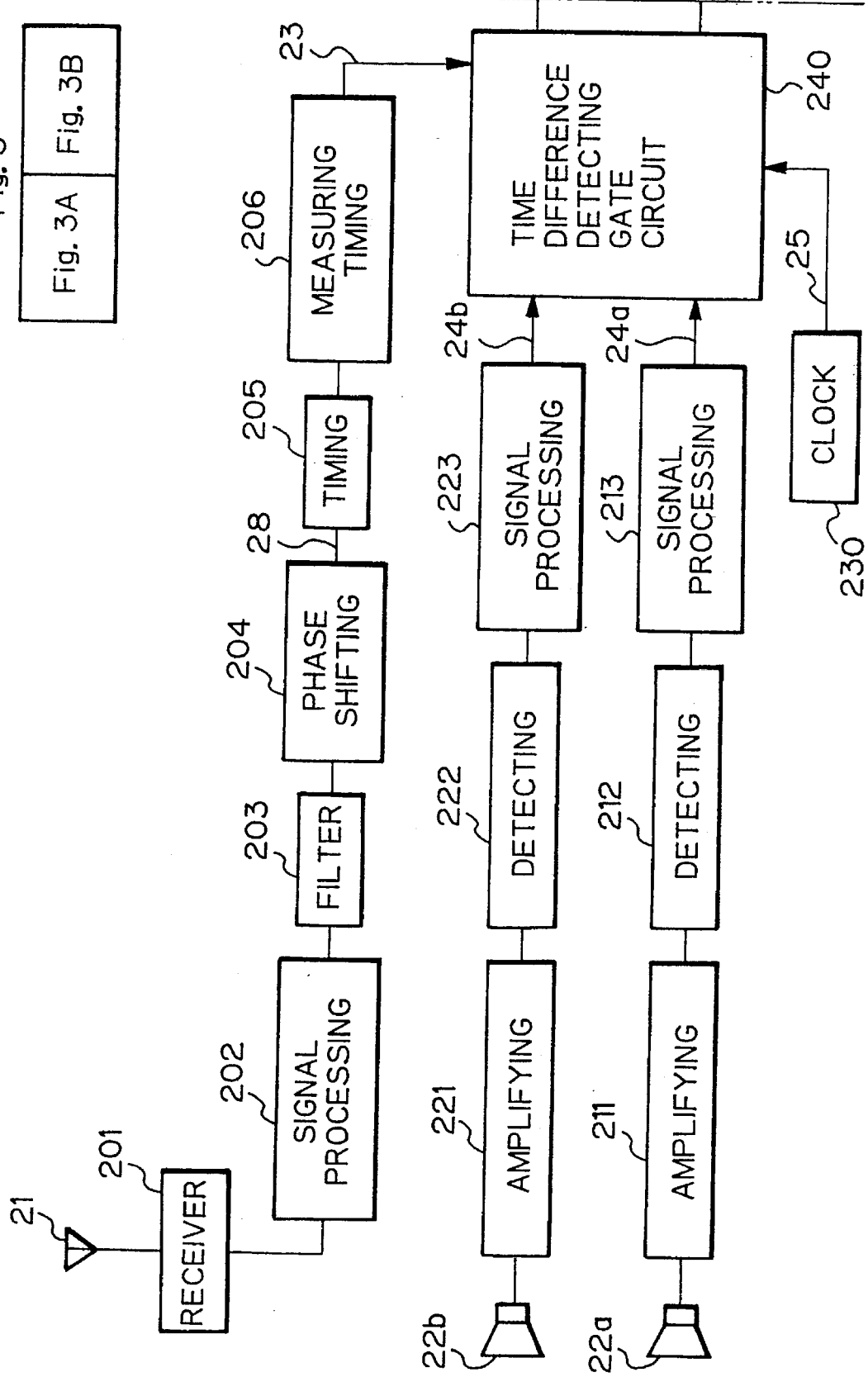
FIG. 3 consists of FIGS. 3A and 3B and is a circuit diagram showing the configuration of a tracking device 2 shown in FIG. 1.
Figure 3B:
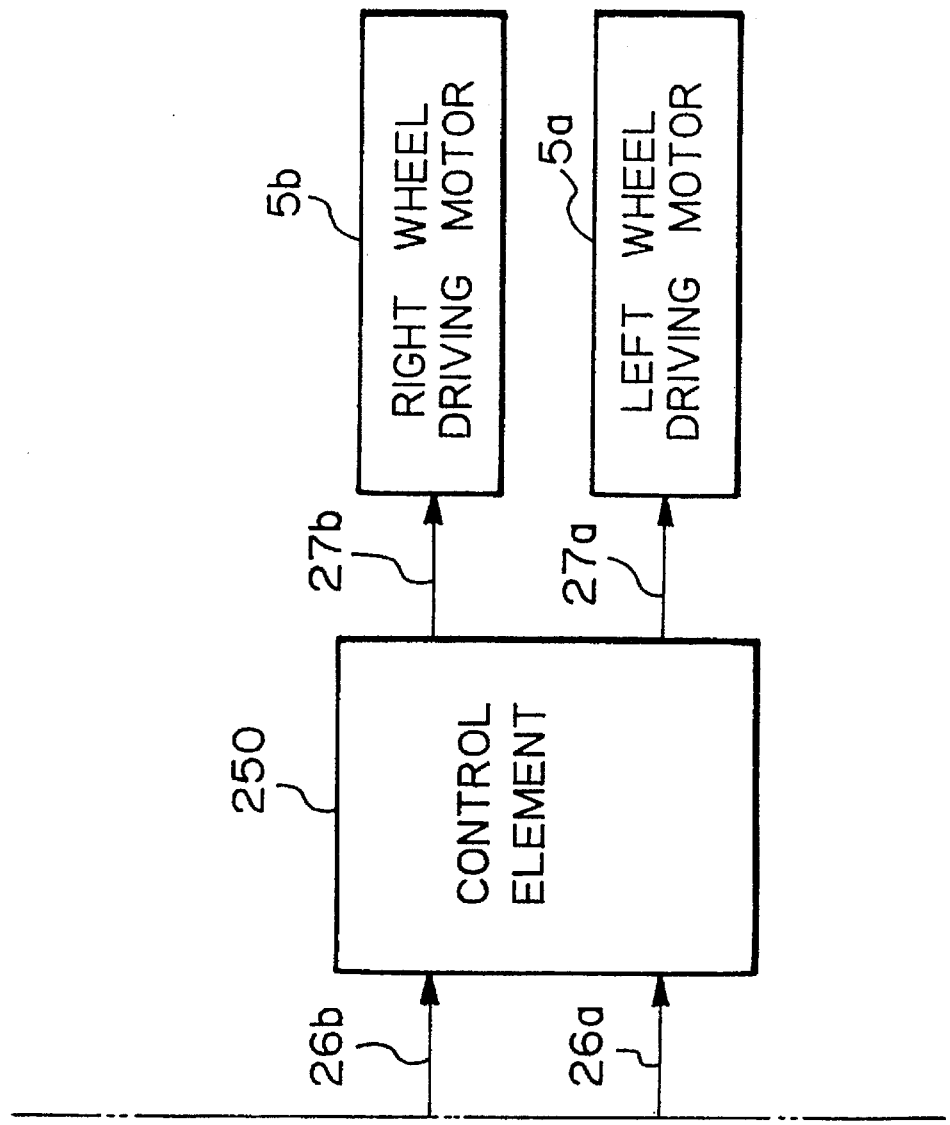

FIG. 3 is a circuit diagram showing the configuration of the tracking device 2 shown in FIG. 1.

In FIG. 3, reference numeral 21 denotes a receiving antenna for receiving an FM wave carrying a synchronizing pulse signal, reference numeral 201 a receiver for receiving the FM wave and outputting a demodulated signal, reference numeral 202 a signal processing circuit for isolating a demodulated signal for signal processing, reference numeral 203 a band-pass filter for allowing passage through the frequency band of a synchronizing pulse signal, reference numeral 204 a phase shifting circuit for correcting a phase deviation generated at the band-pass filter 203 to the same phase as that before input, reference numeral 205 a timing signal synchronizing circuit designed to synchronize with the build-up of a synchronizing pulse signal 28 from the phase shifting circuit 204 so as to activate and/or halt a timing pulse generating circuit and reference numeral 206 a timing pulse generating circuit for generating a measuring timing signal.

In addition, reference numeral 22a and 22b denote, respectively, the first and second ultrasonic receiving oscillators which are disposed transversely apart from each other by an equal distance from the longitudinal center line of the golf cart for receiving ultrasonic waves from the guiding device 1. Reference numerals 211 and 221 denote, respectively, amplifying circuit for amplifying signals received by the ultrasonic receiving oscillators 22a, 22b, reference numerals 212 and 222 denote, respectively, detecting circuits for detecting ultrasonic signals amplified by the amplifying circuits 211, 221, reference numerals 213, 223 denote, respectively, signal processing circuits for comparatively processing detection outputs from the detecting circuits 212, 222 for shaping the wave forms thereof into pulse-like distance signals 24a, 24b, respectively, and reference numeral 230 denotes a clock signal generating circuit for generating a clock pulse 25.

Furthermore, reference numeral 240 denotes a time difference detecting gate circuit for counting the clock pulse 25 in correspondence with the measuring timing signal 23 and first and second ultrasonic distance detecting signals 24a, 24b, reference numerals 26a and 26b denote clock outputs corresponding, respectively, to the ultrasonic distance detecting signals 24a, 24b, and reference numeral 250 denotes a control element having a plurality of counters for counting the clock outputs 26a, 26b, a microcomputer circuit having in turn an operation function, and a driving circuit for driving the driving motors 5a, 5b.

In addition, like reference numerals in FIGS. 1 and 3 denote like constituent elements, respectively.

Figure 4:
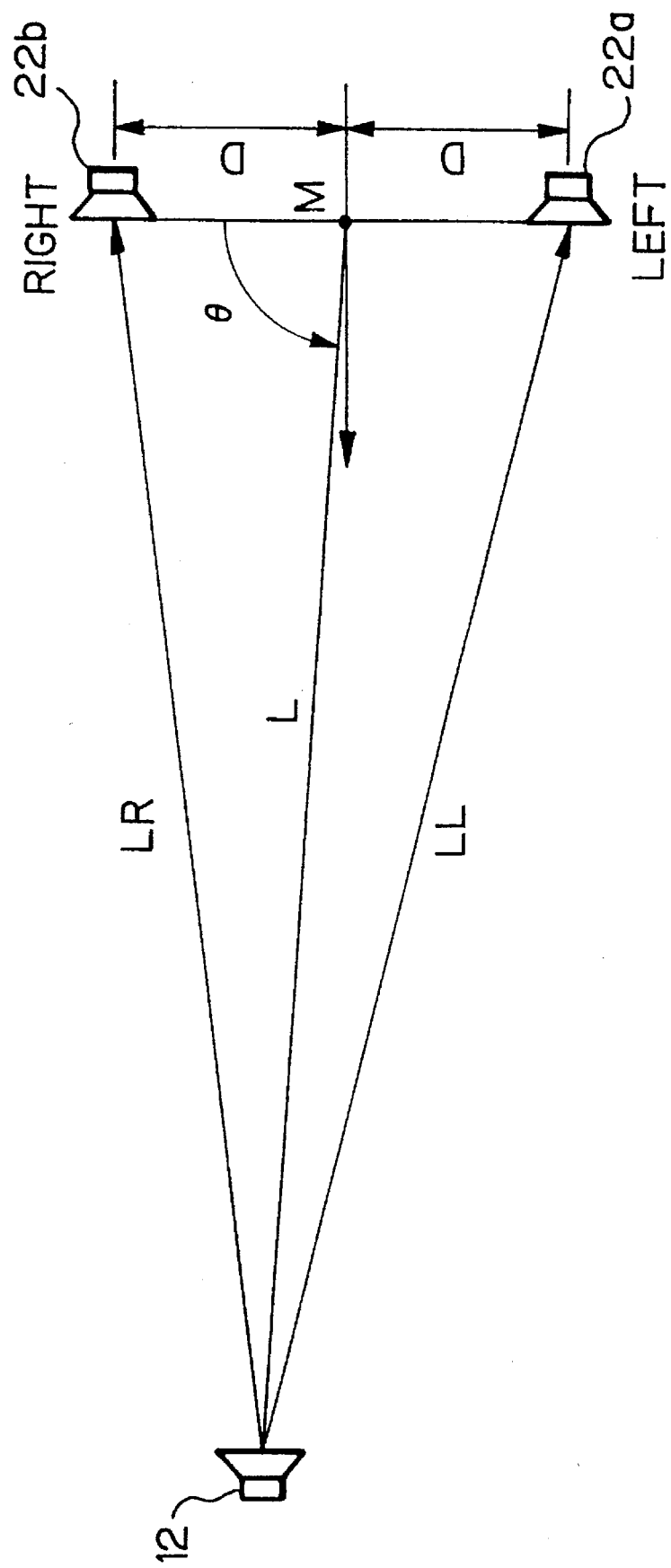
FIG. 4 is an explanatory diagram showing the dispositions of an ultrasonic transmission oscillator 12 of the guiding device and ultrasonic receiving oscillators 22a and 22b on a golf cart 3 shown in FIG. 1.

FIG. 4 is an explanatory diagram showing the dispositions of the ultrasonic transmission oscillator 12 in the guiding device shown in FIG. 1 and the ultrasonic receiving oscillators 22a and 22b mounted on the golf cart 3.

In FIG. 4, M denotes an intermediate point of a straight line connecting the left and right ultrasonic receiving oscillators 22a, 22b, D a distance from the intermediate point M to the left and right ultrasonic receiving oscillators 22a, 22b, respectively, LL a distance between the ultrasonic transmission oscillator 12 and the ultrasonic receiving oscillator 22a, LR a distance between the ultrasonic transmission oscillator 12 to the ultrasonic receiving oscillator 22b, L a distance between the ultrasonic transmission oscillator 12 and the intermediate point M between the left and right ultrasonic receiving oscillators 22a, 22b, and θ angles formed between the ultrasonic transmission oscillator 12 and the left and right ultrasonic receiving oscillators 22a, 22b, respectively.

FIG. 5 is a timing chart showing output wave forms of signals 13, 14, 15, 16 from the respective elements shown in FIG. 2.

FIG. 6 is a timing chart showing output wave forms of signals 28, 23, 24a, 24b, 25, 26a, 26b from the respective elements shown in FIG. 3.

A characteristic operation of the embodiment of the present invention configured as described above will now be described below.

Figure 5A:
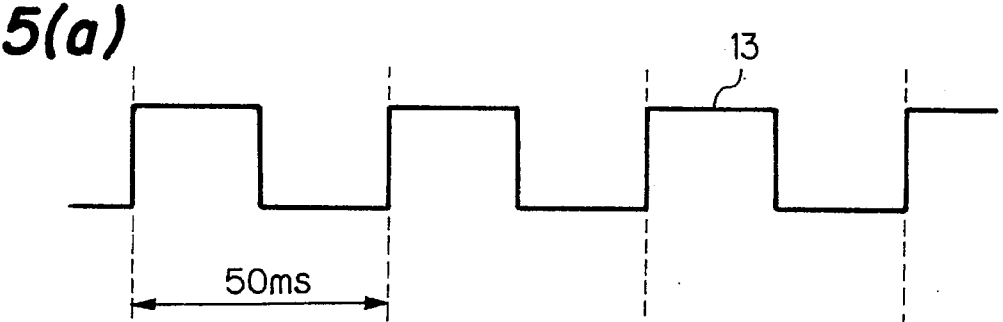
FIG. 5 is a timing chart showing output wave forms of signals 13, 14, 15, 16 from respective sections shown in FIG. 2.
Figure 5B:
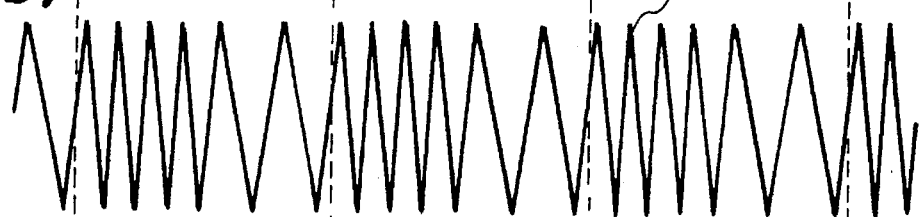

The guiding device 1 is carried by the player, and it generates the synchronizing pulse signal 13 of low frequency and square wave at the synchronizing pulse signal generating circuit 101. This synchronizing pulse signal 13 is, as shown in FIG. 5(a), a continuous square wave of 20 Hz, and when this synchronizing pulse signal 13 is inputted into a transmission input element of the transmitter 102, the FM wave 14 whose frequency is modulated as shown in FIG. 5(b) is outputted from a transmission output element thereof for transmission from the transmission antenna 11.

Figure 5C:
Figure 5D:
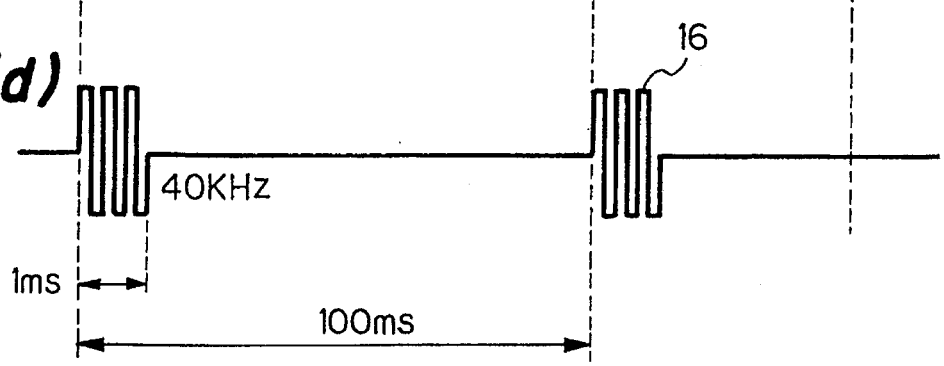

Moreover, the frequency of the synchronizing pulse signal 13 is divided into two at the frequency-dividing circuit 103, and as shown in FIG. 5(c), the ultrasonic transmission timing signal 15 which is a square wave of 10 Hz is generated. This ultrasonic transmission timing signal 15 is modulated at the burst generating circuit 104 such that an ultrasonic wave is radiated in synchronism with the building-up of the ultrasonic transmission timing signal, and the ultrasonic burst signal 16 as shown in FIG. 5(d) is generated. This ultrasonic burst signal 16 drives the ultrasonic transmission oscillator 12 for radiation of an ultrasonic wave. The ultrasonic burst signal of the embodiment has an ultrasonic oscillating frequency of 40 KHz, a radiation continuation time of 1ms and a radiation period of 100 ms.

Figure 6A:
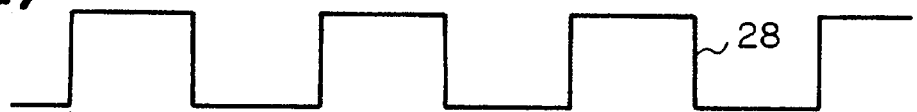
FIG. 6 is a timing chart showing output wave forms of signals 28, 23, 24a, 24b, 25, 26a, 26b from respective sections shown in FIG. 3.
Figure 6B:

On the other hand, in a case where FM wave carrying the synchronizing pulse signal arrives at the tracking device 2 shown in FIG. 3, it is received by the receiving antenna 21, and a demodulated signal obtained when the FM wave is demodulated by the receiver 201 is affected due to multipath and contains noise components other than the square wave synchronizing pulse signal. Since the build-up edge of the synchronizing pulse signal constitutes a reference for time measurement of an ultrasonic pulse, the FM wave needs to be demodulated so as to become a signal having a wave form which is the same as that of the transmitted square wave synchronizing pulse signal. Due to this, the demodulated signal obtained after being demodulated at the receiver 201 is caused to pass through the band-pass filter 203 having a frequency band equal to that of the synchronizing pulse signal whereby the noise components are removed and the synchronizing pulse signal is separated and extracted. Since a phase occurs in the synchronizing pulse signal when it passes through the band-pass filter, the phase so deviating is restored to its original state by the phase shifting circuit 204 so as to obtain the synchronizing pulse signal 28 of 20 Hz as shown in FIG. 6(a). The synchronizing pulse signal 28 is inputted into the timing signal synchronizing circuit 205 which in turn activates the timing pulse generating circuit 206 to thereby obtain the measuring timing signal 23 of 10 Hz as shown in FIG. 6(b).

On the other hand, the ultrasonic signal transmitted from the guiding device 1 is received by the first and second ultrasonic receiving oscillators 22a, 22b, amplified at the amplifying circuits 211, 221, respectively, detected at the detecting circuits 212, 222, respectively, and processed at the signal processing circuits 213, 223, respectively for shaping the wave form thereof, whereby the pulse-like distance detecting signals 24a, 24b are obtained.

Figure 6C:
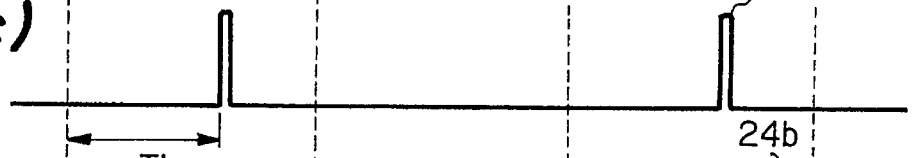
Figure 6D:

These distance detecting signals 24a, 24b are shaped into time wave forms as shown in FIGS. 6(c), 6(d), respectively, and they are signals representing, respectively, ultrasonic wave arriving time ΔTL, ΔTR needed for the ultrasonic pulses to arrive at the ultrasonic receiving oscillators 22a, 22b from the ultrasonic transmission oscillator 12. This arriving time ΔTL, ΔTR is determined by, respectively, the distances LL, LR (distances LL, LR shown in FIG. 4) and propagation velocity C as shown in the following expressions (1) and (2):

$$LL = C \cdot \Delta TL \ldots \quad (1)$$

$$LR = C \cdot \Delta TR \ldots \quad (2)$$

Figure 6E:
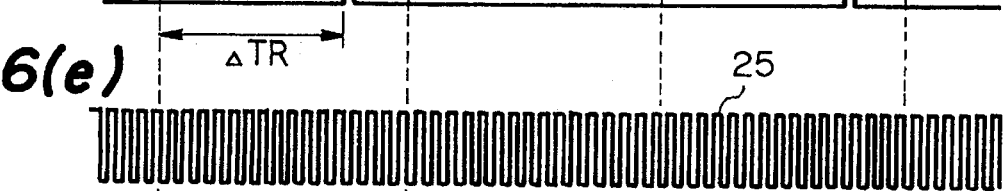
Figure 6F:
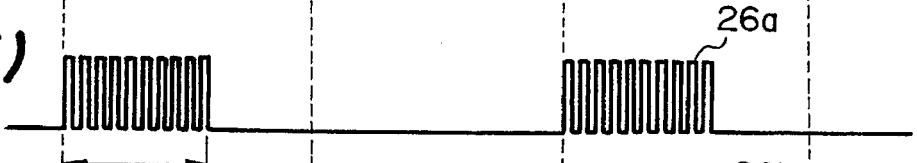
Figure 6G:
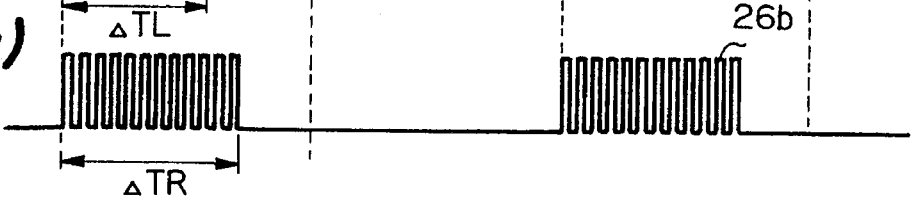

These distance detecting signals 24a, 24b are applied to the time difference detecting gate circuit 240. This time difference detecting gate circuit 240 is provided with a counter which is designed to start counting the clock signal 25 as shown in FIG. 6(e) which is a time measuring reference clock signal (100 KHz in this embodiment) to be inputted into the clock generating circuit 230 in synchronism with the build-up of the measuring timing signal 23 and halts it at the fall of the respective distance detecting signals 24a, 24b, and the clock outputs 26a, 26b as shown in FIGS. 6(f) and 6(g), respectively, are obtained as outputs from the time difference detecting gate circuit in correspondence with the distance detecting signals 24a, 24b.

These clock outputs 26a, 26b (the number of clock pulses) are representative of the ultrasonic wave arriving time ΔTL, ΔTR which are shown in FIG. 4 as corresponding to the distances LL, LR, and these are inputted into the control element 250 and then processed by the counter for counting, whereby the distances LL, LR are calculated using the above expressions (1) and (2), respectively.

Furthermore, the control element 250 calculates the distance L shown in FIG. 4 as a distance to the guiding device and bearing θ (or direction θ) through the following expressions (3) and (4) based on the distances LL, LR so calculated:

$$L = \sqrt{\frac{LL^2 + LR^2 - 2 \cdot D^2}{2}} \quad (3)$$

$$\Theta = \cos^{-1}\left(\frac{L^2 + D^2 - LR^2}{2 \cdot L \cdot D}\right) \cdot \frac{180}{\pi} \quad (4)$$

Moreover, the control element 250 calculates a rotational speed for the left and right wheels which is suitable for the Golf cart 3 to track the player based on the calculated distance L and bearing θ and outputs it as motor control signals 27a, 27b.

At this time, the control element 250 judges whether or not the distance L is equal to or less than a distance $L_0$ which is already set therein, and if the distance L is judged to be equal to or less than the distance $L_0$, the control element controls the motor control signals 27a, 27b such that the Golf cart (tracking device) 3 does not come into collision with the player (Guiding device) 1. In other words, the control element can allow the Golf cart to track the player with a certain distance being maintained therebetween by driving the left and right driving motors 5a, 5b while detecting the distance between the Golf cart and the player and bearing (or direction). These are the characteristics of the present invention.

Figure 7:
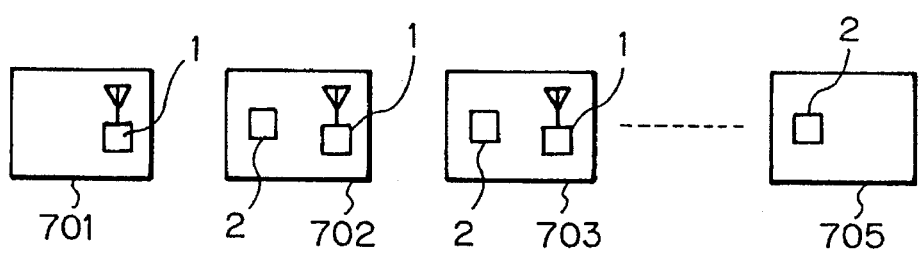
FIG. 7 is an explanatory diagram showing a case in which the present invention is used for another application.

In addition, as shown in FIG. 7, if a plurality of tracking vehicles 702, 703, . . . 704 each having the guiding device 1 are designed to track a guiding vehicle 701, the present invention can be applied to carriers in a factory or playing vehicles in an amusement park. In this case, it is preferable that tracking vehicles which are disposed intermediately are provided with the guiding device 1 and the tracking device 2, while the tracking vehicle disposed at the end of a chain of vehicles is provided with the tracking device 2 only.

As is described heretofore, the present invention provides an automatic guiding and tracking device comprising a guiding device movable to a desired position and a tracking device for tracking the movement of the tracking device, wherein the guiding device comprises in turn a guiding signal generating and transmitting means for generating and transmitting a guiding signal for guiding the tracking device, and wherein the tracking device comprises in turn first and second guiding signal receiving means disposed at predetermined positions which are apart from each other by a predetermined distance for receiving the guiding signal and a control element for detecting a distance and a direction relative to the guiding device based on outputs from the first and second guiding signal receiving means and the predetermined distance between the predetermined positions.

Consequently, it is possible to control the tracking of the guiding device by the tracking device based on direction and distance, thereby eliminating a risk of the tracking device coming into colliding with the guiding device.

Furthermore, the present invention provides the automatic guiding and tracking device as set forth above wherein the guiding signal generating and transmitting means comprises a timing signal transmitting means for transmitting a transmission timing signal of the guiding signal and an ultrasonic transmitting means for transmitting an ultrasonic wave as the guiding signal, wherein the first and second guiding signal receiving means comprise a timing signal receiving means for receiving the transmission timing signal, a first ultrasonic receiving means for receiving the ultrasonic wave, a second ultrasonic receiving means disposed apart from the first ultrasonic receiving means by a predetermined distance for receiving the ultrasonic wave, a clock generating circuit for generating a reference clock of a predetermined frequency and a counting means for counting the reference clock based on the timing signal received from the timing signal transmitting means, a first ultrasonic signal received by the first ultrasonic receiving means and a second ultrasonic signal received by the second ultrasonic receiving means, and wherein the control element includes a means for detecting distance and direction relative to the guiding device for the tracking device based on the contents of the counting means and the distance between the predetermined positions so as to control the running direction and speed of a vehicle having the tracking device mounted thereon.

Consequently, it is possible to control the tracking of the guiding device by the tracking device based on direction and distance, thereby preventing a collision between the guiding device and the tracking device.

Furthermore, since the bearing and the distance are decided based on the ultrasonic signal and the distance between the first and second ultrasonic signal receiving means, the construction of an apparatus is made simpler and further, the bearing and the distance are decided accurately.

What is claimed is:

1. An automatic guiding and tracking device comprising a guiding device movable to a desired position and a tracking device for tracking the movement of said guiding device;

wherein said guiding device comprises,
(a) ultrasonic signal transmitting means for transmitting an ultrasonic signal as a guiding signal for guiding said tracking device, and
(b) timing signal transmitting means for transmitting a timing signal of said guiding signal;

wherein said tracking device comprises,
(a) timing signal receiving means for receiving said timing signal,
(b) first ultrasonic signal receiving means for receiving said ultrasonic signal,
(c) second ultrasonic signal receiving means spaced apart from said first ultrasonic signal receiving means by a predetermined distance for receiving said ultrasonic signal,
(d) a clock generating circuit for generating a reference clock of a predetermined frequency,
(e) a counting means for counting said reference clock based on said timing signal received from said timing signal transmitting means, a first ultrasonic signal received by said first ultrasonic signal receiving means and a second ultrasonic signal received by said second ultrasonic signal receiving means, and
(f) control means for detecting a distance and a direction to said guiding device from said tracking device based on the counting of said counting means and said predetermined distance so as to control a running direction and a speed of a vehicle having said tracking device mounted thereon.

2. An automatic guiding and tracking device as set forth in claim 1, wherein said guiding device is portable so that it can be carried by a person and wherein said tracking device is mounted on a golf cart.

3. An automatic guiding and tracking system for guiding plural vehicles to follow in turn the path of a lead vehicle, said system comprising a plurality of guiding devices and a plurality of tracking devices each for tracking the movement of a respective one of said guiding devices;

wherein each of said guiding devices comprises,
(a) ultrasonic signal transmitting means for transmitting an ultrasonic signal as a guiding signal for guiding a respective tracking device, and
(b) timing signal transmitting means for transmitting a timing signal of said guiding signal, wherein each of said tracking devices comprises,
(a) timing signal receiving means for receiving said timing signal,
(b) first ultrasonic signal receiving means for receiving said ultrasonic signal,
(c) second ultrasonic receiving means spaced apart from said first ultrasonic receiving means by a predetermined distance for receiving said ultrasonic signal,
(d) a clock generating circuit for generating a reference clock of a predetermined frequency,
(e) a counting means for counting said reference clock based on said timing signal received from said timing signal transmitting means, a first ultrasonic signal received by said first ultrasonic signal receiving means and a second ultrasonic signal received by said second ultrasonic signal receiving means, and
(f) control means for detecting a distance and a direction to said guiding device from said tracking device based on the counting of said counting means and said predetermined distance so as to control a running direction and speed of a vehicle having said tracking device mounted thereon; and wherein the lead vehicle has a one of said guiding devices mounted thereto, a final vehicle has a one of said tracking devices mounted thereto, and each vehicle between the lead and final vehicles has both a guide device and a tracking device mounted thereto, and wherein the tracking device mounted to each vehicle tracks the movement of the guiding device of a respective preceding vehicle.

* * * * *